US008045997B2

(12) United States Patent
Pan et al.

(10) Patent No.: US 8,045,997 B2
(45) Date of Patent: Oct. 25, 2011

(54) MOBILE PHONE WITH STEPLESS MOTION FUNCTION

(75) Inventors: Chia-Ho Pan, Taipei (TW); Shu-Ting Kuo, Taipei (TW)

(73) Assignee: ASUSTeK Computer, Inc., Taipei (TW)

( * ) Notice: Subject to any disclaimer, the term of this patent is extended or adjusted under 35 U.S.C. 154(b) by 790 days.

(21) Appl. No.: 12/149,192

(22) Filed: Apr. 29, 2008

(65) Prior Publication Data
US 2009/0054101 A1 Feb. 26, 2009

(30) Foreign Application Priority Data

Aug. 24, 2007 (TW) ................. 96131387 A (51) Int. Cl.
*H04W 24/00* (2009.01)
(52) U.S. Cl. ............... 455/456.1; 455/575.3; 455/575.4; 455/550.1; 379/433.11; 379/433.12
(58) Field of Classification Search ............. 455/575.3, 455/575.4, 575.8, 90.3, 575.1, 550.1, 128, 455/456.1; 349/58, 702, 900, 906; 379/433.11, 379/433.12
See application file for complete search history.

(56) References Cited

U.S. PATENT DOCUMENTS

| 6,334,600 | B1 * | 1/2002 | Sakamoto | 248/424 |
| 7,962,179 | B2 * | 6/2011 | Huang | 455/566 |
| 2004/0181909 | A1 * | 9/2004 | Kawamoto | 16/330 |
| 2005/0204508 | A1 * | 9/2005 | Duan et al. | 16/303 |
| 2006/0018039 | A1 * | 1/2006 | Nuno | 359/704 |
| 2006/0034666 | A1 * | 2/2006 | Wentworth et al. | 405/184 |
| 2006/0203357 | A1 * | 9/2006 | Irisawa | 359/696 |
| 2007/0060220 | A1 * | 3/2007 | Hsu | 455/575.4 |
| 2007/0094843 | A1 * | 5/2007 | Yang | 16/330 |
| 2008/0041049 | A1 * | 2/2008 | Sakamoto | 60/487 |

FOREIGN PATENT DOCUMENTS
TW 255888 6/2006
* cited by examiner

*Primary Examiner* — Nick Corsaro
*Assistant Examiner* — Mahendra Patel
(74) *Attorney, Agent, or Firm* — Muncy, Geissler, Olds & Lowe, PLLC (57) ABSTRACT

A mobile phone with a stepless motion function is provided and includes a mobile phone body, an upper cover which can be movably provided outside the mobile phone body, and a pushing device including a first end part and a second end part, wherein the first end part is fixedly provided at the upper cover, and the second end part is fixedly provided at the mobile phone body, whereby the upper cover can move at a constant velocity from a first position to a second position relatively to the mobile phone body. Therefore, the mobile phone with a stepless motion function of the invention enables the upper cover to move at a constant velocity at the mobile phone body to increase the tactile sensation of the mobile phone.

15 Claims, 9 Drawing Sheets

MOBILE PHONE WITH STEPLESS MOTION FUNCTION

BACKGROUND OF THE INVENTION

1. Field of the Invention

The invention relates to slidable and flip-type mobile phones and, more particularly, to a mobile phone with a stepless motion function.

2. Description of the Related Art

Along with the development of the science and technology, a mobile phone has gradually been a needful electronic product in the daily life of people. However, along with the increment of the demand for mobile phones, more and more manufacturers begin to produce mobile phones, so that the mobile phones with a plurality of additional functions as their features are gradually changed to be more and more various and have shapes with a tactile sensation in the manufacture. The slidable mobile phone, the flip-type mobile phone and the bar-type mobile phone are works of big mobile phone manufacturers.

Making a comprehensive view of mobile phones of each big mobile phone manufacturer on the market, the mobile phones not only have a plurality of additional functions, but also have light, slim, short and small shapes, so that people not only use the mobile phones in their daily life, but also collect the mobile phones in their home to decorate.

However, shapes of the mobile phones of each manufacturer on the market have their own features, but tactile sensations of the mobile phones are rough. The upper cover with a two-stage spring structure of the slidable mobile phone is most obvious, and not only external force is needed to push the upper cover to make the elastic force of the spring cause the upper cover to slide relatively to the mobile phone body to be separated, but also the two-stage structure is damaged after the mobile phone is operated by the external force for long time. Therefore, the slidable mobile phone having the above problem can cause the desire of collecting the mobile phone of the people to be reduced.

Therefore, the inventor provides a mobile phone with a stepless motion function to solve the above problem based on the spirit of active creation, and the invention are achieved after research and experiments.

BRIEF SUMMARY OF THE INVENTION

The invention mostly provides a mobile phone with a stepless motion function, and the mobile phone includes a mobile phone body, an upper cover which can be movably provided outside the mobile phone body and a pushing device which includes a first end part and a second end part, wherein the first end part is fixedly provided at the upper cover, and the second end part is fixedly provided at the mobile phone body, thereby the upper cover moves at a constant velocity from a first position to a second position relatively to the mobile phone body. Therefore, the main objective of the invention is to provide a mobile phone with a stepless motion function to enable the upper cover to move at a constant velocity at the mobile phone body to increase the tactile sensation of the mobile phone.

In the above mobile phone with a stepless function of the invention, the first position is a closed position and the second position is an opened position.

In the above mobile phone with a stepless function of the invention, the first position is an opened position and the second position is a closed position.

In the above mobile phone with a stepless function of the invention, the first end part is the end of a telescopic bar, and the second end part is the end of a cylinder body, and then a fluid or an elastic component in the cylinder body can push the telescopic bar to enable the upper cover to slide at a constant velocity from the first position to the second position relatively to the mobile phone body.

In the above mobile phone with a stepless function of the invention, the first end part is the end of a cylinder body, and the second end part is the end of a telescopic bar, and then a fluid or an elastic component in the cylinder body can push the telescopic bar to enable the upper cover to slide at a constant velocity from the first position to the second position relatively to the mobile phone body.

In addition, to control actions of the pushing device, a pressing switch is further provided at the mobile phone to control the actions of the pushing device to enable the upper cover moving at a constant velocity from the first position to the second position relatively to the mobile phone body.

The pressing switch can further actuate a first fastening component which is assembled at the first end part and a second fastening component which is assembled on the mobile phone body to make the mobile phone body separated from or fastened with the upper cover via a resettable pressing component assembled on the upper cover to control the actions of the pushing device.

The pressing switch can also have a different action mode, and it can actuate a third fastening component which is engraved on the outside surface of the telescopic bar and a fourth fastening component which is engraved in the cylinder body via a resettable pressing component assembled on the upper cover to make the mobile phone body separated from or fastened with the upper cover, and then the actions of the pushing device can also be controlled.

The invention provides a mobile phone whose cover can be flipped at a constant velocity, and the mobile phone includes a mobile phone body, an upper cover which can be flipped and provided outside the mobile phone and a rotating device including a first end part and a second end part, wherein the first end part is fixedly provided at the upper cover, and the second end part is fixedly provided at the mobile phone body to enable the upper cover to be flipped at a constant velocity from a closed position to an opened position relatively to the mobile phone body.

In the above mobile phone whose cover can be flipped at a constant velocity of the invention, the first end part is the end of a telescopic bar and the second end part is the end of a cylinder body, and then an elastic component in the cylinder body pushes the telescopic bar to rotate to enable the upper cover to be flipped at a constant velocity from a closed position to an opened position relatively to the mobile phone body.

In the above mobile phone whose cover can be flipped at a constant velocity of the invention, the mobile phone further includes a control mechanism for controlling actions of the rotating device to enable the upper cover to be flipped at a constant velocity from a closed position to an opened position relatively to the mobile phone body.

In the above mobile phone whose cover can be flipped at a constant velocity of the invention, the control mechanism includes an oval motion sliding block at one end of the telescopic bar and two protrudent blocks at the inner edge of the second end part.

In the above mobile phone whose cover can be flipped at a constant velocity of the invention, a motion track is engraved in the cylinder body, and then the elastic component in the cylinder body provides a push force to enable the motion sliding block to move at a constant velocity at the motion track further to make the upper cover move at a constant velocity from the first position to the second position relatively to the mobile phone body.

Therefore, the invention provides a mobile phone with a stepless motion function to enable the upper cover to move at a constant velocity relatively to the mobile phone body to increase the tactile sensation of the mobile phone.

DETAILED DESCRIPTION OF THE EMBODIMENTS

Three embodiments are taken to illustrate the invention to make the persons having ordinary skill in the art easily understand advantages and other effective benefits of the invention.

Figure 1:
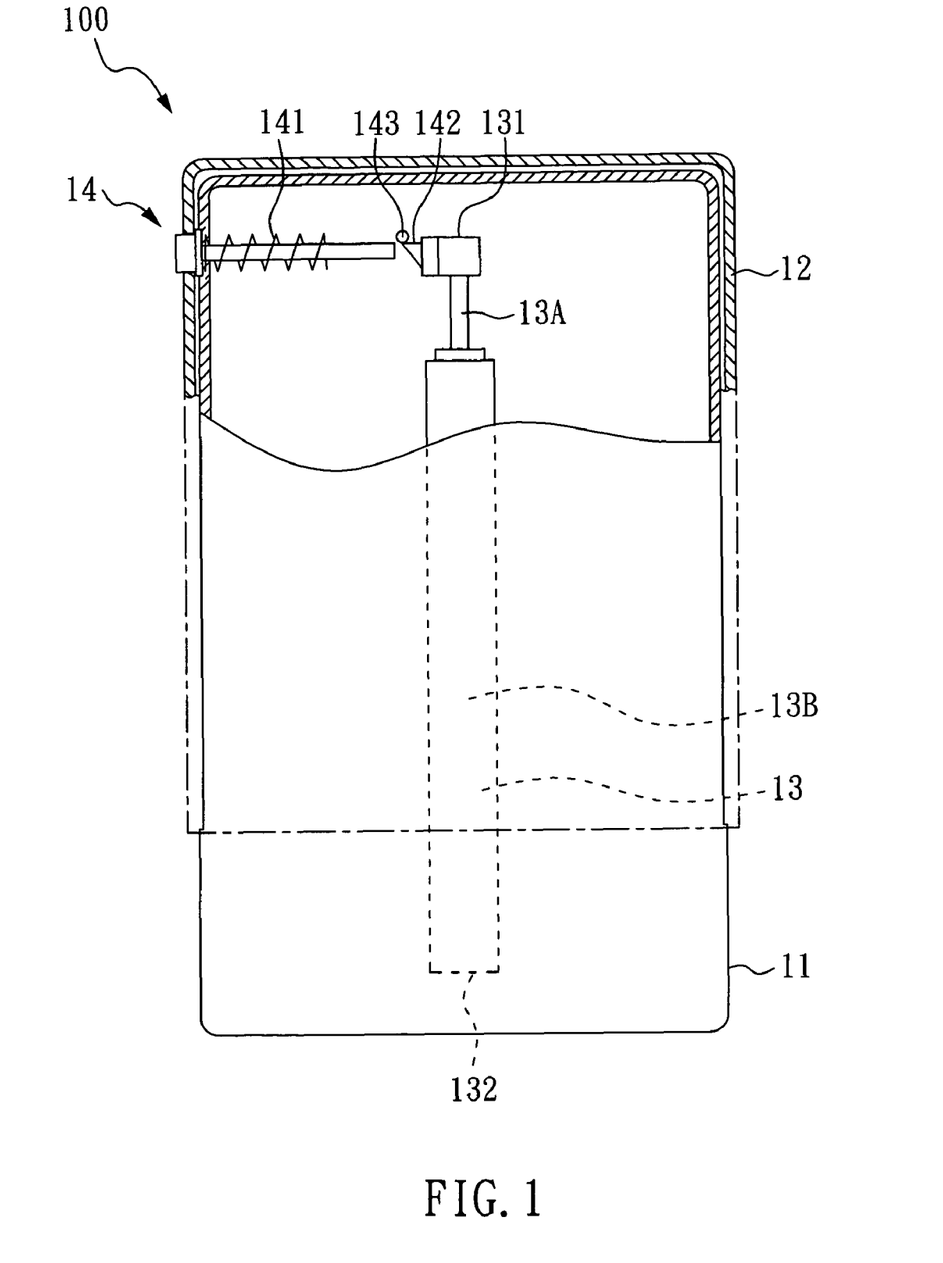
FIG. 1 is a schematic diagram showing the status that the upper cover of the first preferred embodiment of the invention is closed.
Figure 2:
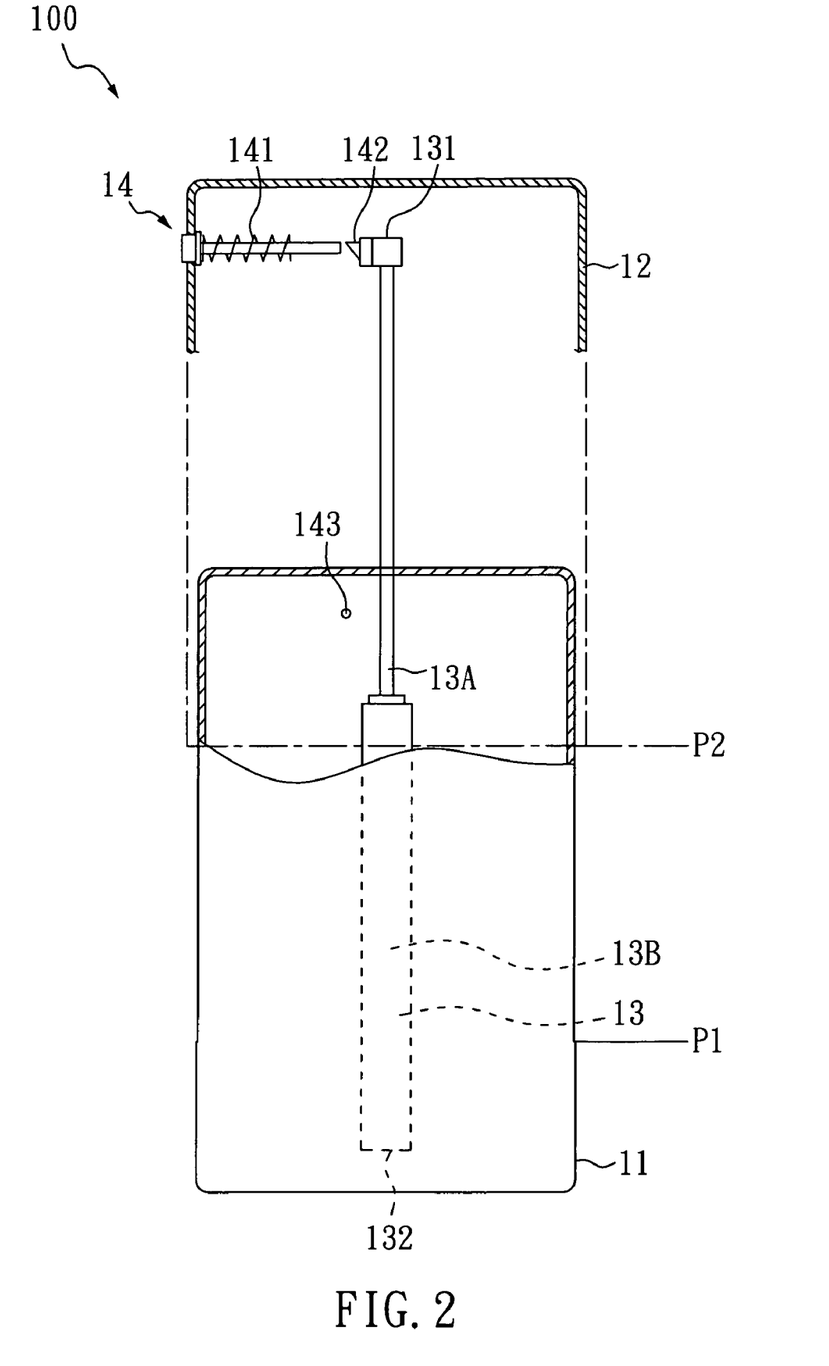
FIG. 2 is a schematic diagram showing the status that the upper cover of the first preferred embodiment of the invention is opened.

Please refer to FIG. 1 and FIG. 2, wherein FIG. 1 is a schematic diagram showing the mobile phone with a stepless motion upper cover of the first preferred embodiment of the invention when the upper cover is closed and FIG. 2 is a schematic diagram showing the mobile phone with a stepless motion upper cover of the first preferred embodiment of the invention when the upper cover is opened. As shown in FIG. 1 and FIG. 2, a mobile phone with a stepless motion function 100 provided by the invention includes a mobile phone body 11, an upper cover 12, a pushing device 13 and a pressing switch 14.

The mobile phone body 11 is a main body with a communication function.

The upper cover 12 is a cover which can move outside the mobile phone body 11 and has a function of protecting the mobile phone body 11. In the embodiment, the upper cover 12 can be provided slidingly outside the mobile phone body which has a tactile sensation.

The pushing device 13 includes a first end part 131 and a second end part 132. The first end part 131 is fixedly provided at the upper cover 12, and the second end part 132 is fixedly provided at the mobile phone body 11. In the embodiment, the first end part 131 is the end of a telescopic bar 13A of the pushing device 13, and the second end part 132 is the end of a cylinder body 13B of the pushing device 13, and then a fluid or an elastic component which has a specific pressure in the cylinder body 13B provides a push force to push the telescopic bar 13A to make the upper cover 12 move at a constant velocity from a first position P1 to a second position P2 relatively to the mobile phone body 11. The first position P1 is a closed position, and the second position P2 is an opened position.

The pressing switch 14 includes a resettable pressing component 141, a first fastening component 142 and a second fastening component 143. The resettable pressing component 141 is assembled on the above upper cover 12, the first fastening component 142 is assembled at a position adjacent to the first end part 131, and the second fastening component 143 is assembled on the mobile phone body 11. And then the resettable pressing component 141 assembled on the upper cover 12 actuates the first fastening component 142 and the second fastening component 143 to control the mobile phone body 11 to be separated from or fastened with the upper cover 12. In the embodiment, the first fastening component 142 is a tenon.

Figure 3:
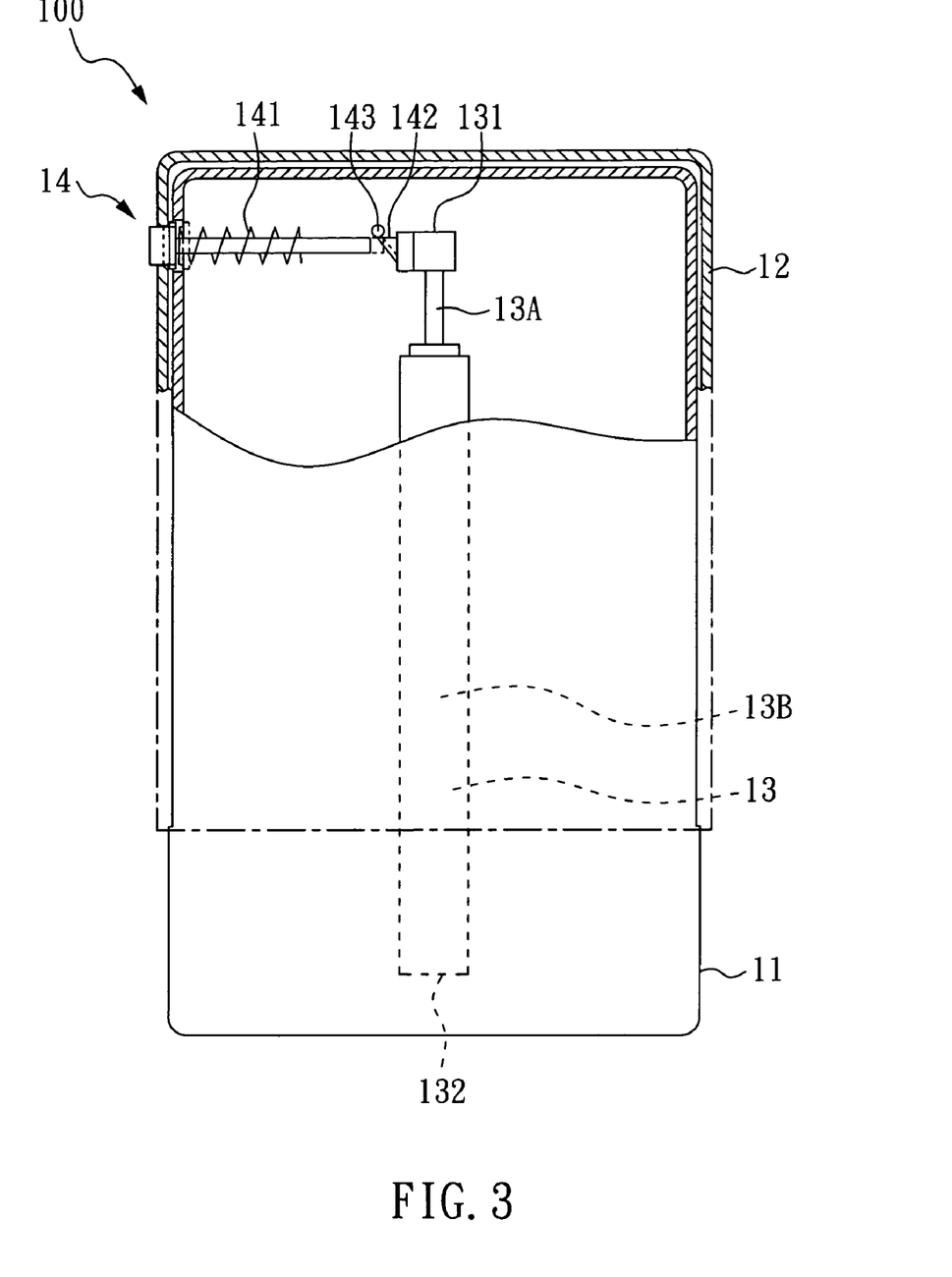
FIG. 3 is a schematic diagram showing actions of the pressing switch of the first preferred embodiment of the invention.

To sum up, in the embodiment, the pressing switch 14 is used to control actions of the pushing device 13 to make the upper cover 12 move at a constant velocity from the first position P1 to the second position P2 relatively to the mobile phone body 11. For example, as shown in FIG. 3, when a user wants to open the closed upper cover 12, he can press the pressing switch 14 at the lateral surface of the upper cover to push the first fastening component 142 away further to make the first fastening component 142 and the second fastening component 143 separated, and then the constant push force of the pushing device 13 can be applied to the upper cover 12 to make the upper cover 12 move away from the mobile phone body 11 at a constant velocity.

Figure 4:
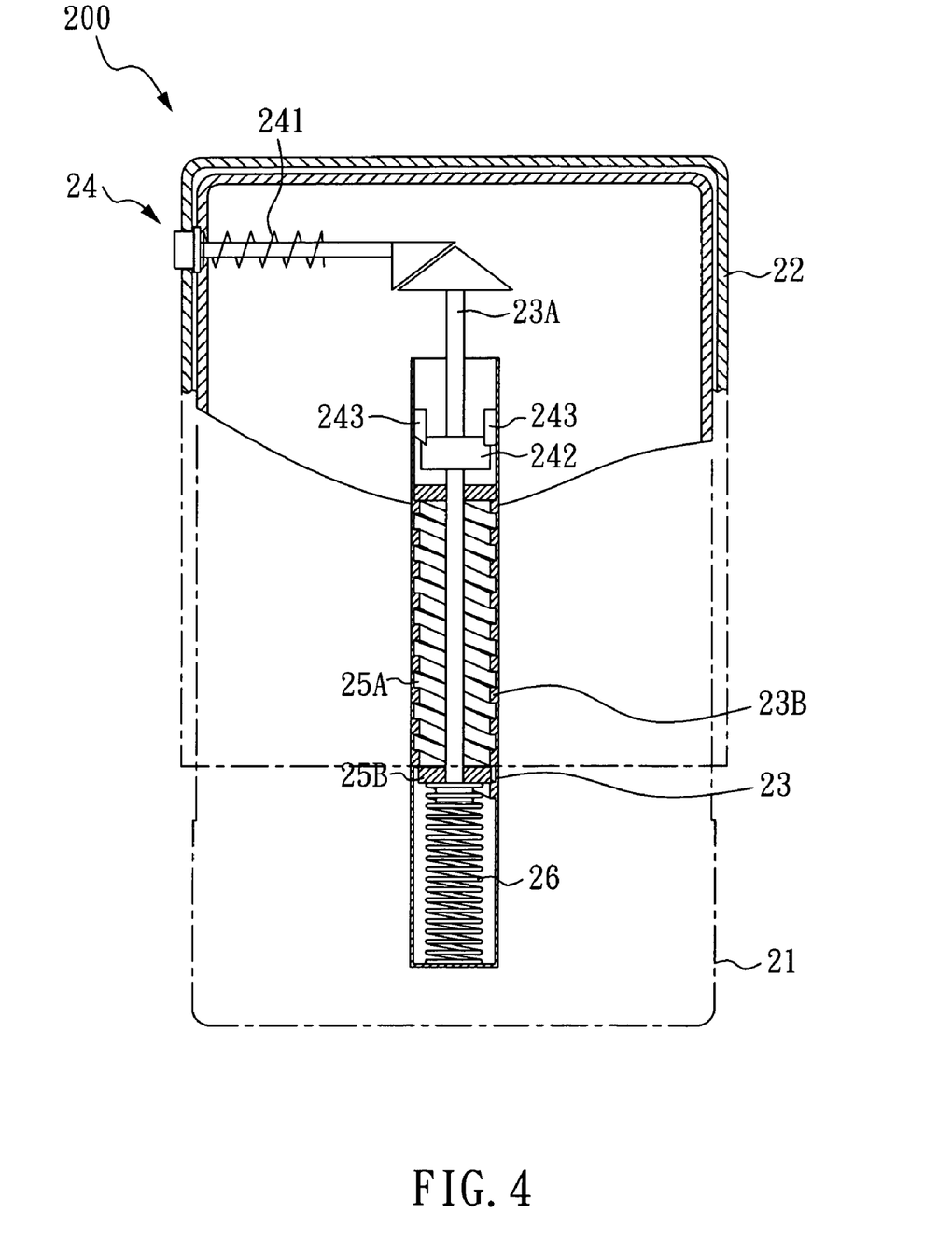
FIG. 4 is a schematic diagram showing the status that the upper cover of the second preferred embodiment of the invention is closed.
Figure 5:
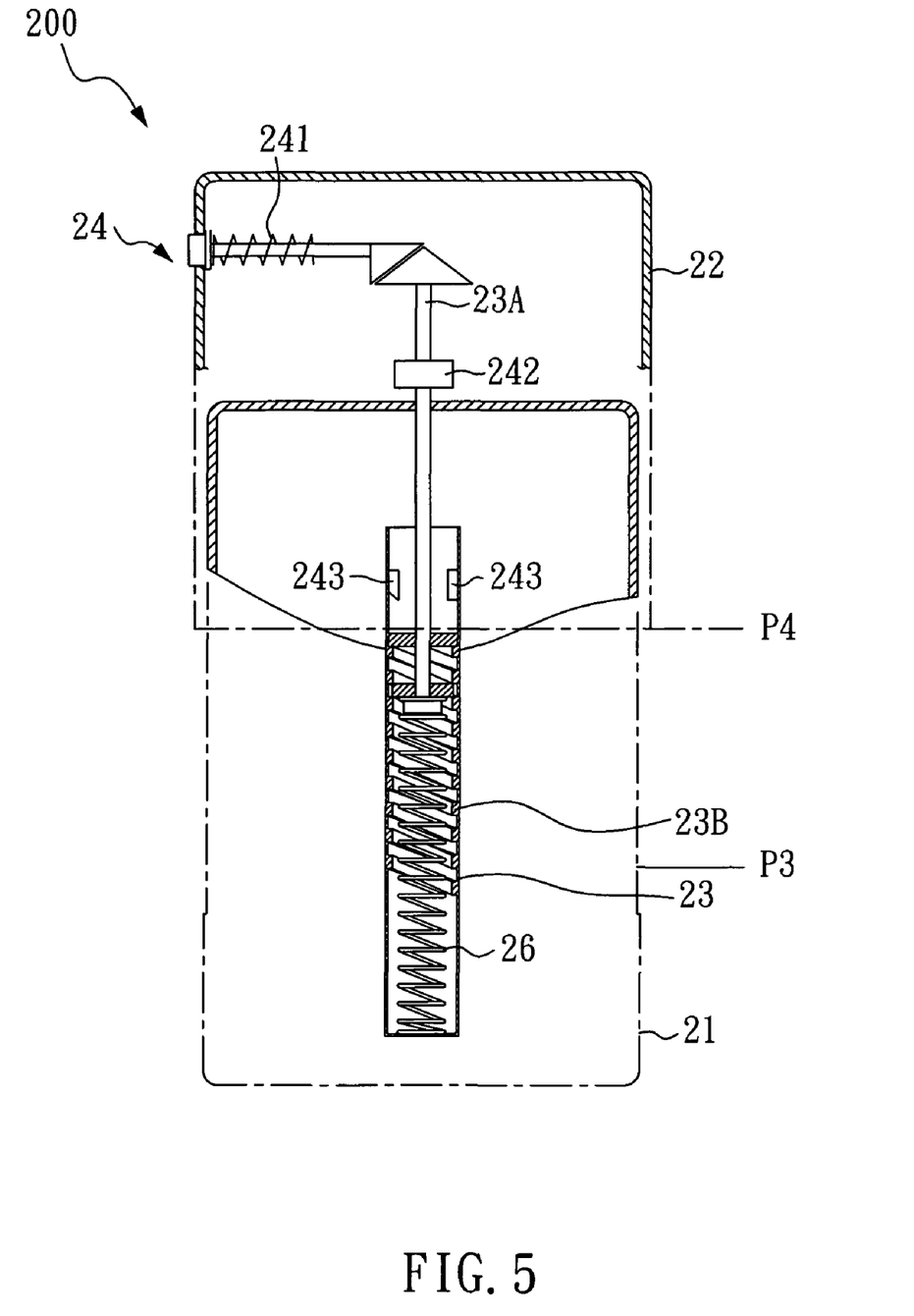
FIG. 5 is a schematic diagram showing the status that the upper cover of the second preferred embodiment of the invention is opened.

Please refer to FIG. 4 and FIG. 5, wherein FIG. 4 is a schematic diagram showing the mobile phone with a stepless motion upper cover of the second preferred embodiment of the invention when the upper cover is closed, and FIG. 5 is a schematic diagram showing the mobile phone with a stepless motion upper cover of the second preferred embodiment of the invention when the upper cover is opened.

Figure 6:
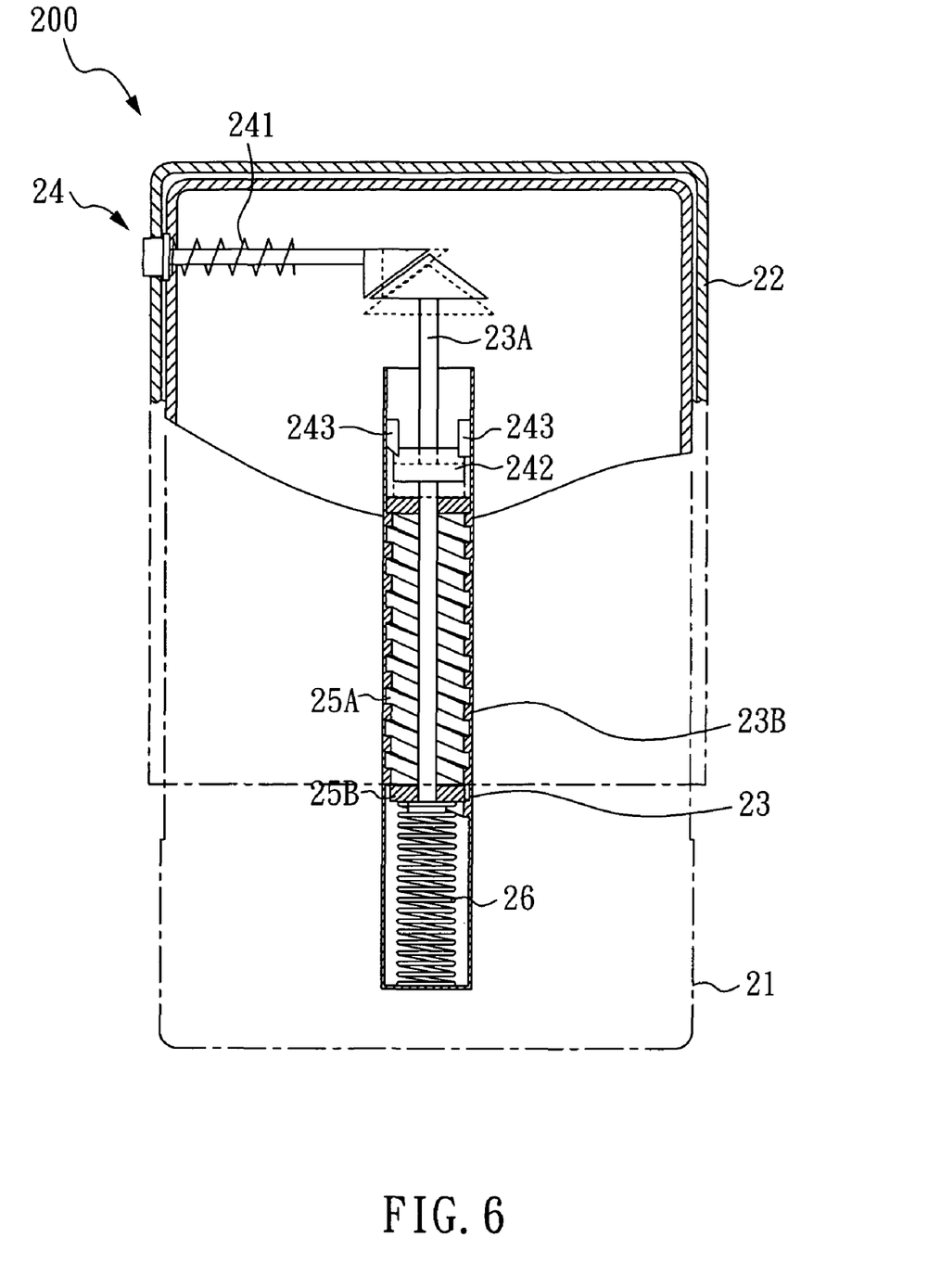
FIG. 6 is a schematic diagram showing actions of the pressing switch of the second preferred embodiment of the invention.

As shown in FIG. 4 and FIG. 5, the mobile phone structure with a stepless motion upper cover 200 of the second preferred embodiment of the invention includes a mobile phone body 21, an upper cover 22 and a pushing device 23. The difference between the mobile phone structure with a stepless motion upper cover 200 and the mobile phone structure with a stepless motion upper cover 100 in the first preferred embodiment is that the pressing switch 24 via a resettable pressing component 241 actuates a third fastening component 242 which is assembled at the outside surface of the telescopic bar 23A and a fourth fastening component 243 which is engraved in the cylinder body 23B to control actions of the pushing device 23, and then the upper cover 22 moves at a constant velocity from a third position P3 to a fourth position P4 relatively to the mobile phone body 21 to control the mobile phone body 21 to be separated from or fastened with the upper cover 22. Another difference is that in the embodiment, an elastic component 26 in the cylinder body 23B provides a push force, a motion sliding block 25B is provided at the telescopic bar 23A, and a motion track 25A is engraved in the cylinder body 23B. The push force provided by the elastic component 26 in the cylinder body 23B pushes the telescopic bar 23A to cause the motion sliding block 25B to move at a constant velocity along the motion track 25A, and then the upper cover 22 can achieve stepless motion efficiency relative to the mobile phone body 21. For example, as shown in FIG. 6, when a user wants to open the closed upper cover 22, he can press the pressing switch 24 at the lateral surface of the upper cover to make the telescopic bar 23A move toward the cylinder body 23B for a short distance by force, and then the third fastening component 242 rotates for a short degree in the cylinder body 23B and is separated from the fourth fastening component 243, so that the upper cover 22 slides at a constant velocity to be separated from the mobile phone body 21 for the elastic component 26 in the cylinder body 23B causes the motion sliding block 25B to move at a constant velocity relatively to the motion track 25A.

Figure 7:
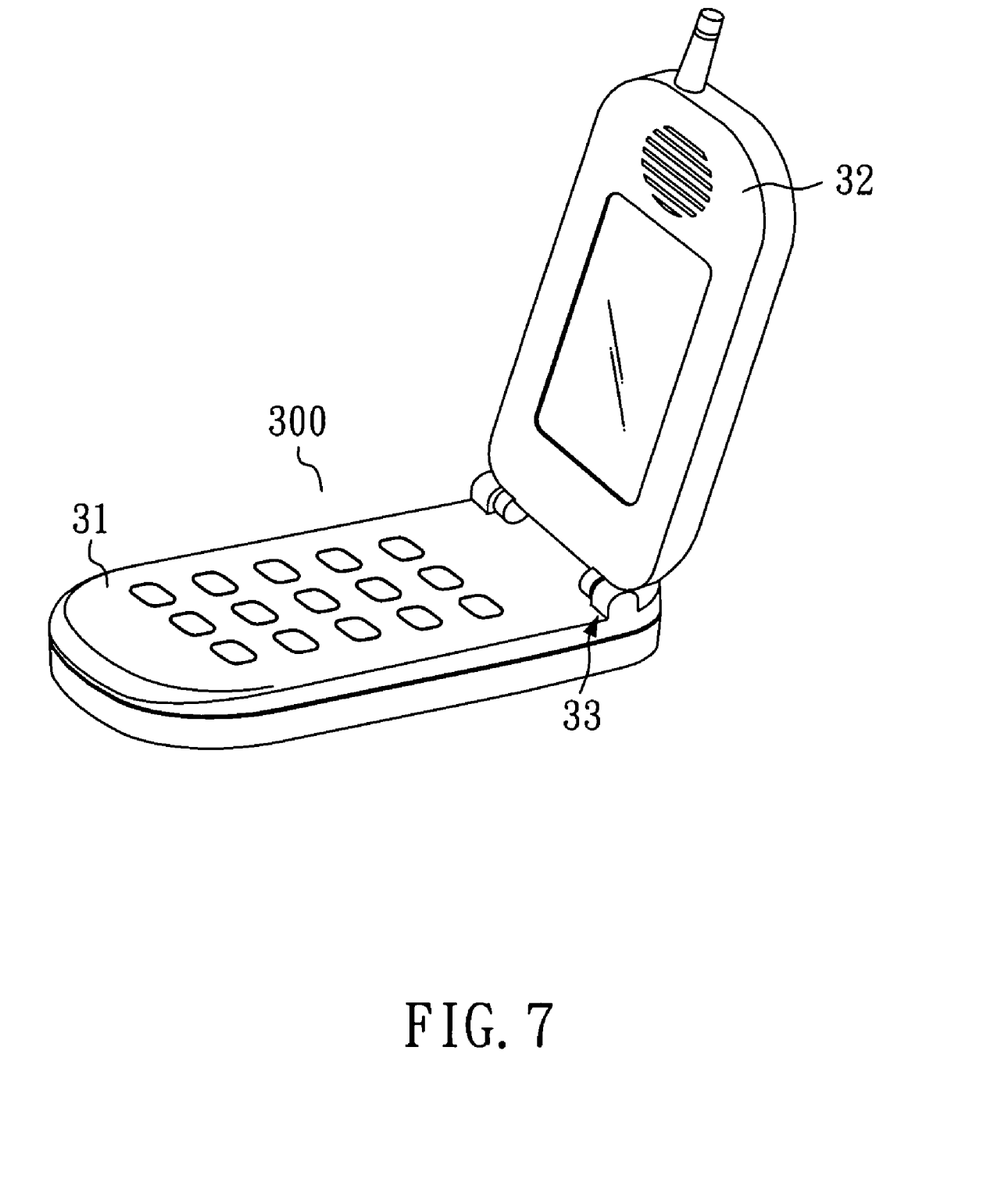
FIG. 7 is a schematic diagram showing the third preferred embodiment of the invention.
Figure 8:
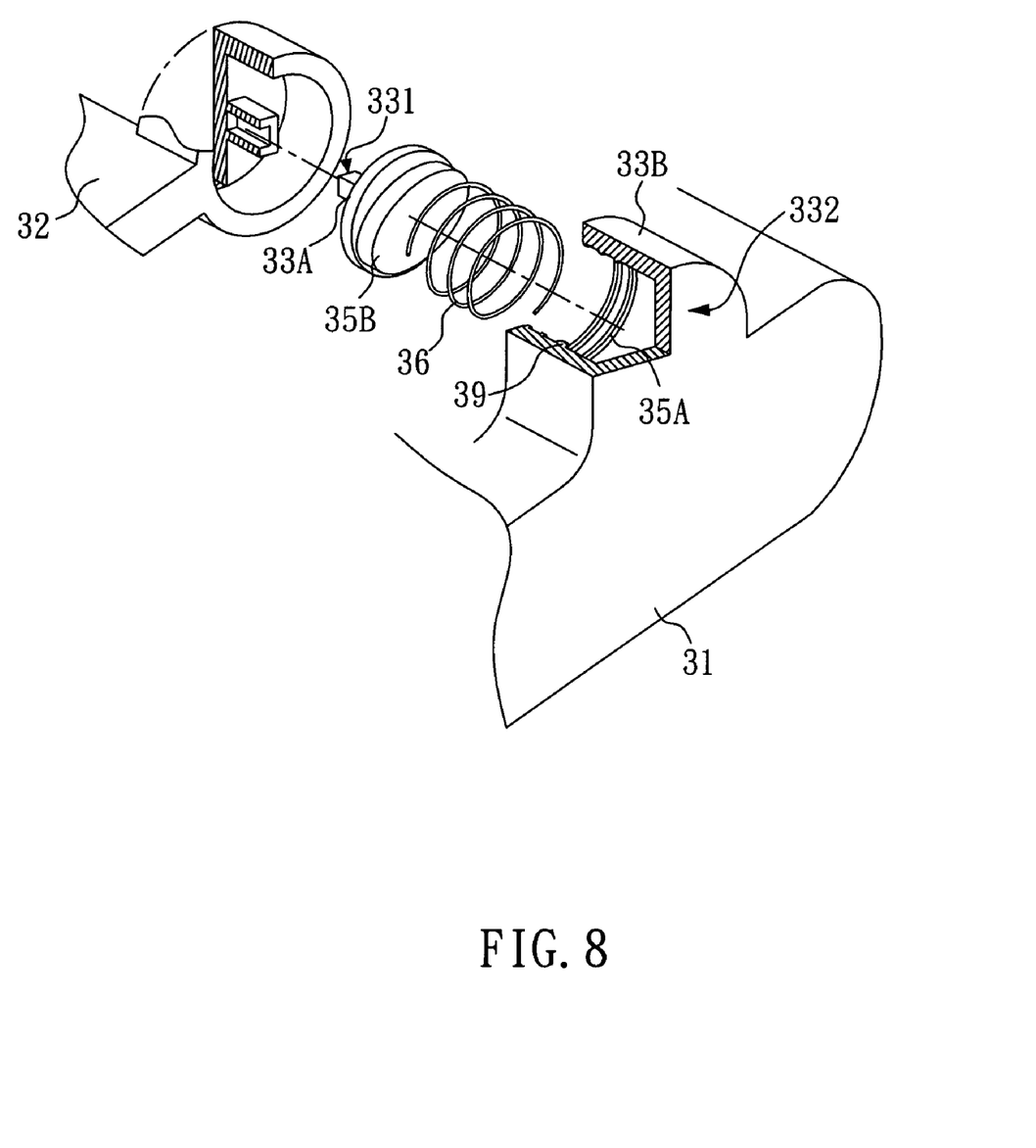
FIG. 8 is an exploded diagram showing the rotating device of the third preferred embodiment of the invention.
Figure 9:
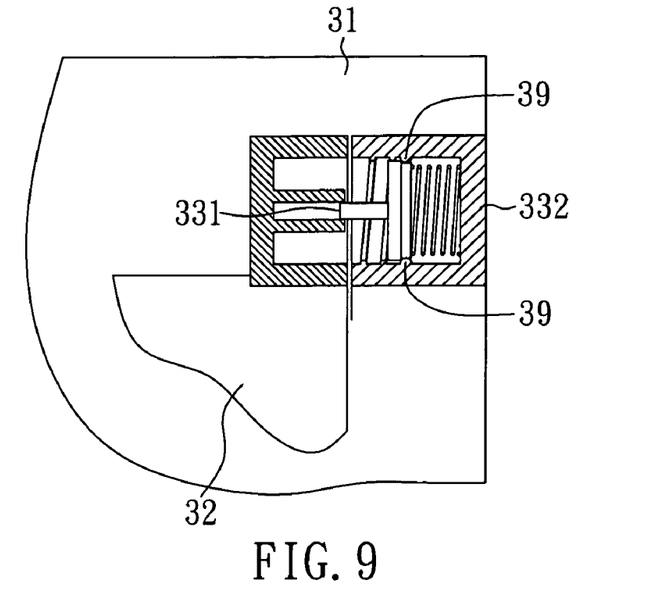
FIG. 9 is a schematic diagram showing the status that the upper cover of the third preferred embodiment of the invention is closed.
Figure 10:
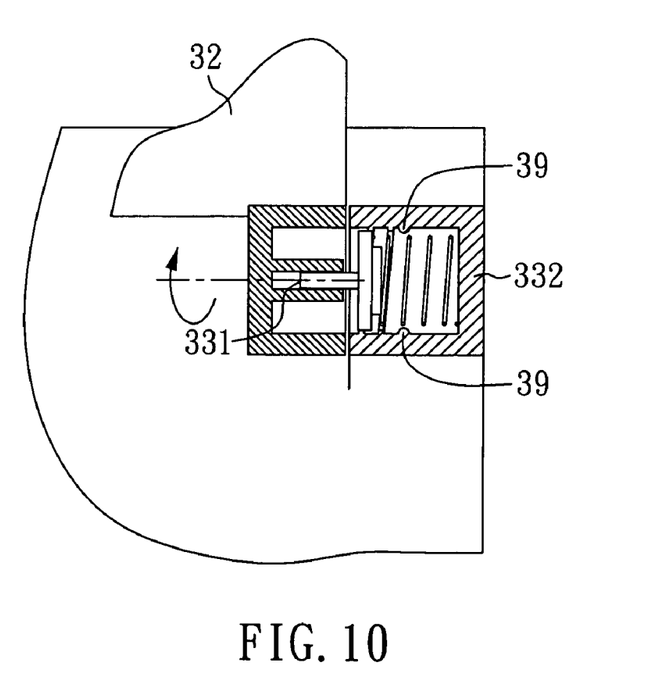
FIG. 10 is a schematic diagram showing the status that the upper cover of the third preferred embodiment of the invention is opened.

FIG. 7 shows a mobile phone whose cover can be flipped at a constant velocity of the third embodiment of the invention, and the mobile phone structure 300 includes a mobile phone body 31, an upper cover 32 and a rotating device 33. FIG. 8 is an exploded diagram showing the above rotating device 33, FIG. 9 is a schematic diagram showing the status that the upper cover of the third preferred embodiment of the invention is closed, and FIG. 10 is a schematic diagram showing the status that the upper cover of the third preferred embodiment of the invention is opened. The rotating device 33 includes a first end part 331 and a second end part 332 which can rotate relatively to each other, and the first end part 331 is fixedly provided at the upper cover 32, and the second end part 332 is fixedly provided at the mobile phone body 31. In the embodiment, the first end part 331 is the end of the telescopic bar 33A of the rotating device 33, and the second end part 332 is the end of the cylinder body 33B of the rotating device 33. A motion sliding block 35B is provided at the telescopic bar 33A, and a motion track 35A is engraved in the cylinder body 33B. An elastic component 36 is provided in the cylinder body 33B to provide a push force. The motion sliding block 35B at the end of the telescopic bar 33A has an oval shape, and the inner edge of the second end part 332 provided at the end of the cylinder body 33B has two protrudent blocks 39. When a flip-type mobile phone is closed (as shown in FIG. 9), the telescopic bar 33A retracts inward to compress the elastic component 36, and since the oval motion sliding block 35B is locked by the protrudent blocks 39 of the second end part 332, the upper cover 32 and the mobile phone body 31 are closed. When the upper cover 32 is flipped by external force, the oval motion sliding block 35B is released from the protrudent blocks 39 of the second end part 332, and the motion sliding block 35B is caused by the push force provided by the elastic component 36 in the cylinder body 33B to move at a constant velocity along the motion track 35A further to push the telescopic bar 33A to rotate, so that the upper cover 32 can be flipped at a constant velocity relatively to the mobile phone body 31.

Therefore, in the above embodiments, the invention provides a mobile phone with a stepless motion upper cover to make the upper cover move at a constant velocity relatively to the mobile phone body, and the tactile sensation of the mobile phone is increased.

The above embodiments are only examples for conveniently illustrating the invention and the scope of appended claims should not be limited to the description of the embodiments described above.

What is claimed is:

1. A mobile phone with a stepless motion function, the mobile phone comprising:
    a mobile phone body;
    an upper cover movably provided outside the mobile phone body; and
    a pushing device which comprises a first end part and a second end part, wherein the first end part is fixedly provided at the upper cover, and the second end part is fixedly provided at the mobile phone body, whereby the upper cover moves at a constant velocity from a first position to a second position relatively to the mobile phone body;
    wherein the first end part is the end of a telescopic bar, and the second end part is the end of a cylinder body, and then a fluid in the cylinder body can push the telescopic bar to enable the upper cover to move at a constant velocity from the first position to the second position relatively to the mobile phone body.

2. The mobile phone according to claim 1, wherein the first position is a closed position and the second position is an opened position.

3. The mobile phone according to claim 1, wherein the first position is an opened position and the second position is a closed position.

4. The mobile phone according to claim 1, wherein the first end part is the end of a cylinder body, and the second end part is the end of a telescopic bar, and then a fluid in the cylinder body can push the telescopic bar to enable the upper cover to move at a constant velocity from the first position to the second position relatively to the mobile phone body.

5. The mobile phone according to claim 1, wherein the first end part is the end of a telescopic bar and the second end part is the end of a cylinder body, and then an elastic component in the cylinder body can push the telescopic bar to enable the upper cover to move at a constant velocity from the first position to the second position relatively to the mobile phone body.

6. The mobile phone according to claim 1, wherein the first end part is the end of a cylinder body, and the second end part is the end of a telescopic bar, and then an elastic component in the cylinder body can push the telescopic bar to enable the upper cover to move at a constant velocity from the first position to the second position relatively to the mobile phone body.

7. The mobile phone according to claim 2 further comprising a pressing switch or a control mechanism for controlling actions of the pushing device to enable the upper cover to move at a constant velocity from the first position to the second position relatively to the mobile phone body.

8. The mobile phone according to claim 7, wherein the pressing switch can further actuate a first fastening component which is assembled at a position adjacent to the first end part to be separated from or fastened with a second fastening component which is assembled on the mobile phone body via a resettable pressing component assembled on the upper cover to control the actions of the pushing device.

9. The mobile phone according to claim 7, wherein the pressing switch can further actuate a third fastening component assembled at the outside surface of the telescopic bar to be separated from or fastened with a fourth fastening component engraved in the cylinder body via a resettable pressing component assembled on the upper cover to control the actions of the pushing device.

10. The mobile phone according to claim 5, wherein a motion track is engraved in the cylinder body, and a motion sliding block corresponding to the motion track is provided outside the telescopic bar, and then the elastic component in the cylinder body provides a push force to enable the motion sliding block to move at a constant velocity at the motion track further to make the upper cover move at a constant velocity from the first position to the second position relatively to the mobile phone body.

11. The mobile phone according to claim 6, wherein a motion track is engraved in the cylinder body, and a motion sliding block corresponding to the motion track is provided outside the telescopic bar, and then the elastic component in the cylinder body provides a push force to enable the motion sliding block to move at a constant velocity at the motion track further to make the upper cover move at a constant velocity from the first position to the second position relatively to the mobile phone body.

12. A mobile phone whose cover can be flipped at a constant velocity, the mobile phone comprising:
a mobile phone body;
an upper cover which can be flipped and provided outside the mobile phone; and
a rotating device comprising a first end part and a second end part, wherein the first end part is fixedly provided at the upper cover, and the second end part is fixedly provided at the mobile phone body to enable the upper cover to be flipped at a constant velocity from a closed position to an opened position relatively to the mobile phone body,
wherein the first end part is the end of a telescopic bar, and the second end part is the end of a cylinder body, and then an elastic component in the cylinder body pushes the telescopic bar to rotate to enable the upper cover to be flipped at a constant velocity from the closed position to the opened position relatively to the mobile phone body.

13. The mobile phone according to claim 12, further comprising a control mechanism for controlling actions of the rotating device to enable the upper cover to be flipped at a constant velocity from the closed position to the opened position relatively to the mobile phone body.

14. The mobile phone according to claim 13, wherein the control mechanism comprises an oval motion sliding block at one end of the telescopic bar and two protrudent blocks at the inner edge of the second end part.

15. The mobile phone according to claim 14, wherein a motion track is engraved in the cylinder body, and then the elastic component in the cylinder provides a push force to enable the motion sliding block to move at a constant velocity at the motion track further to make the upper cover flipped at a constant velocity from the first position to the second position relatively to the mobile phone body.

* * * * *